Figure 1:
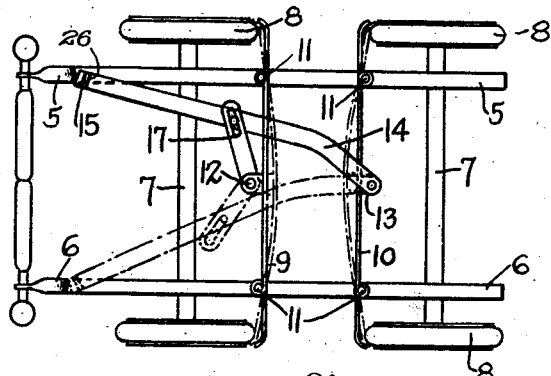

Dec. 22, 1925.

M. KAHNE 1,566,675

BABY CARRIAGE BRAKE

Filed Aug. 9, 1924

INVENTOR
Michael Kahne
BY
ATTORNEY

Patented Dec. 22, 1925.

1,566,675

UNITED STATES PATENT OFFICE.

MICHAEL KAHNE, OF NEW YORK, N. Y.

BABY-CARRIAGE BRAKE.

Application filed August 9, 1924. Serial No. 731,167.

*To all whom it may concern:*

Be it known that I, MICHAEL KAHNE, a citizen of the United States of America, residing at New York city, county and State of New York, have invented certain new and useful Improvements in Baby-Carriage Brakes, of which the following is a specification.

This invention relates to brakes for baby carriages and in particular to a type which can be locked.

A particular object of the invention is to provide a brake for a baby carriage which will lock all four wheels simultaneously and securely, so that anyone attempting to wheel the carriage away will be stopped and can only take the carriage by carrying it. Most of the carriages are locked by braking two wheels which makes it comparatively easy to move the carriage on the two unlocked wheels.

A further object of the invention is to provide a hand operated brake, inasmuch as the foot operated brakes now in general use, not only become damaged easily but also mar the footwear of the person using the same.

A still further object is to provide a brake which, when the four wheels have been locked, may itself be locked so that only the person with the proper key can unlock the brake rod to release the wheels.

Figure 2:
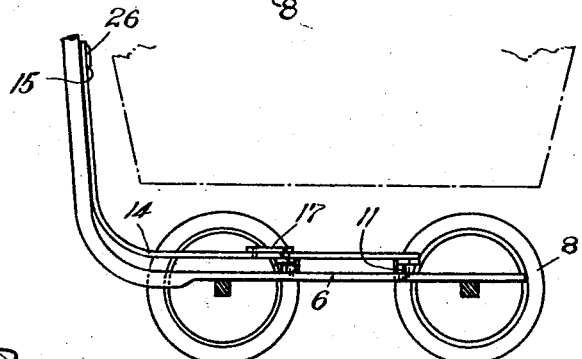
Figure 3:
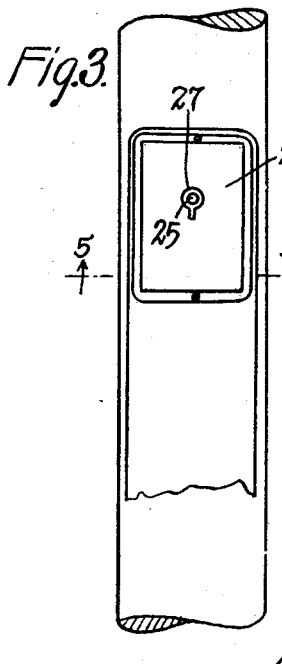
Figure 4:
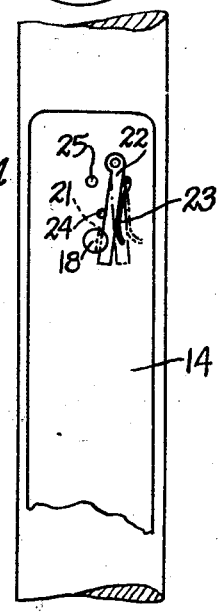
Figure 5:
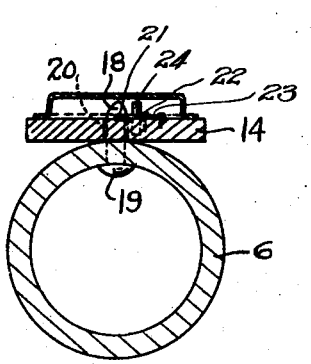

Other objects and advantages will appear as the specification progresses, reference being had to the drawing wherein;

Figure 1 is a top plan view of the lower portion of the frame of a baby carriage, the brake thereof being shown in unlocked position in full lines, and in locking position in outline, Figure 2 is a view in side elevation of the lower portion of a baby carriage showing the embodiment of my improved four wheel brake, Figure 3 is a view in elevation of the handle end of the brake lever locked in position to one of the handle bars of the baby carriage frame, Figure 4 is a view similar to Figure 3 showing the end of the brake lever with the cover removed to show the method of locking the same in position against the handle bar, and Figure 5 is a section taken on the line 5—5 of Figure 3 and shows the arrangement of parts of the locking device.

Referring to the drawing in detail 5 and 6 indicate the lower portion or extension of the handle bars of a baby carriage, the same being joined at spaced points by the usual axles 7 which carry the wheels 8.

In order that a brake may be applied to the wheels, I provide the two brake rods or bars 9 and 10 which are made of a tough slightly resilient metal so that they will yield when pressure is exerted thereon. These brake bars 9 and 10 are pivoted as at 11 to the handle bar extensions 5 and 6.

On the brake bars 9 and 10 midway between the handle bar extensions I provide ears 12 and 13, respectively, the ear 13 having pivoted thereto a brake operating lever 14, the upper end of which, as at 15, constitutes a handle. This operating lever extends from the ear 13 rearwardly to the handle bars of the carriage and is bent upwardly to conform with the same, extending a suitable distance up the handle bars to be conveniently grasped by the person wheeling the carriage.

The operating lever is swingable from one handle bar to the other and when against the handle bar 6 is in locking position with the brakes applied.

The brake rod 9 through the ear 12 is connected by a link 17 to the operating lever 14 so that when the lever is swung over to locking position the link 17 will offer resistance and the only part that will give, will be the brake bars 9 and 10 which will move toward each other at their centers and thus throw their outer ends, beyond the pivot points 11, firmly against the wheels to lock the same.

When the wheels are locked, the operating lever 14 or handle will be against the carriage handle bar 6, and in position to be snapped over a projecting bolt pin 18 which is suitably riveted as at 19 in the hollow handle bar 6 of the carriage frame.

The end of the lever 14 is provided with an opening 20 through which the bolt pin 18 passes, the latter having a slot 21 therein, into which snaps an elongated latch 22 to hold the lever in locked position over the pin. The latch 22 is pivoted to the lever 14 and is normally held partly over the opening 20 by the flat spring 23 and against a dowel 24, the spring being suitably riveted to the lever 14. A key guiding pin 25 is employed near the pivot point of the spring and, when a key is placed thereover, an extension on said key will move the latch 22 out of the slot 21 in the bolt pin 18 and allow the lever 14 to be drawn to unlocking position.

A suitable cover 26 having a key opening 27 therein is attached in any well known manner to the lever 14 over the latch operating parts, so that when the lever is snapped into locked position on the handle bar 6 it cannot be released except by the person having the key.

It will be seen then that a swinging movement of the lever 14 towards handle bar 6 will brake all four wheels of the carriage while a reverse movement will release them. Also when in braked position they will remain so until the lock is opened.

It will be noted that the covering 26 forms a hand hold for the end of the lever 14, as it will be made of nickel, brass or other finished metal.

Having described my invention what I claim is:—

1. In combination with a baby carriage, a braking device comprising a pair of resilient wheel engaging members pivoted near their outer ends, a movable hand lever pivoted to one of said members, and adapted to swing on its pivot point, and means connecting said other wheel engaging member and said lever whereby when the latter is moved in one direction both of said resilient members will be caused to brake said wheels, and means for locking said hand lever to one of the handle bars of the carriage when the brake is applied.

2. In combination with a baby carriage, a braking device comprising wheel engaging members, a swingable hand operated lever pivoted to one of said members, a link connecting said other wheel engaging member and said lever, whereby when the lever is swung to one position both resilient members are operated to brake all the wheels simultaneously, and a latch member for locking the lever in position to one of the handle bars of the carriage to keep the wheels braked.

3. In combination with a baby carriage, a braking device operable to lock all of the wheels simultaneously, a lever for operating said braking device, a slotted pin on one of the handle bars of the carriage, and a spring pressed arm near the end of said lever for engaging said pin to lock the lever in position on said handle.

4. In combination with a baby carriage, a braking device operable to lock all of the wheels simultaneously, a lever for operating said braking device, a slotted pin on one of the handle bars of the carriage, a spring pressed arm near the end of said lever for engaging said pin to lock the lever in position on said handle, and means for utilizing a key for releasing said spring pressed arm whereby the lever may be moved away from the handle, and a cover for the end of said lever.

In testimony whereof I hereunto affix my signature.

MICHAEL KAHNE.